Sept. 6, 1966 T. RUMMEL 3,271,209
METHOD OF ELIMINATING SEMICONDUCTOR MATERIAL PRECIPITATED UPON A HEATER IN EPITAXIAL PRODUCTION OF SEMICONDUCTOR MEMBERS
Filed Feb. 19, 1963
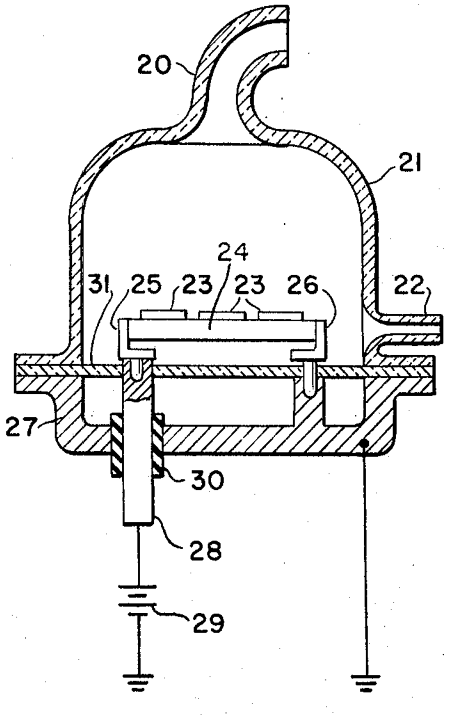

United States Patent Office 3,271,209

Patented Sept. 6, 1966

3,271,209

METHOD OF ELIMINATING SEMICONDUCTOR MATERIAL PRECIPITATED UPON A HEATER IN EPITAXIAL PRODUCTION OF SEMICONDUCTOR MEMBERS

Theodor Rummel, Munich, Germany, assignor to Siemens & Halske Aktiengesellschaft, Berlin, Germany, and Munich, Germany, a corporation of Germany Filed Feb. 19, 1963, Ser. No. 259,582
Claims priority, application Germany, Feb. 23, 1962, S 78,192
10 Claims. (Cl. 148—175)

My invention relates to the production of monocrystalline semiconductor layers on flat substrates of semiconductor material by epitaxial precipitation. According to this method, a gaseous semiconductor compound is thermally dissociated and the resulting semiconductor substance is precipitated upon a monocrystalline substrate, such as a flat disc or plate, which is placed upon a support operating as a heater for producing the necessary reaction temperature. As a rule, the heater is internally heated by electric current supplied either by connecting the end of the heater to a voltage source or by inductively generating the current in the heater itself, thus establishing and maintaining the necessary temperature of the heater above that required for epitaxial precipitation at the surface of the substrates. The process is often employed for providing monocrystalline semiconductor discs with one or more layers of different conductance type, different specific resistance, or both. A more detailed description of such processes is available, if desired, in my copending application Serial No. 86,389, filed February 1, 1961, now U.S. Patent 3,145,447.

One of the difficulties encountered with such processes is the fact that the semiconductor substance precipitating from the gaseous compounds does not only grow upon the semiconductor members but also upon the surface of the heater. For that reason, a supporting heater, as a rule, can be used only a few times, particularly for silicon epitaxy. At those places that were covered by semiconductor substrates during the preceding precipitation method, there occur indentations, due to the fact that the surrounding surface areas of the heater become coated with precipitation. Disassembling and reinserting the heater for cleaning or exchange is a rather complicated and costly matter and entails the danger that the heater and the other processing equipment may become contaminated with impurities.

It is an object of my invention to provide an improved method of removing from the supporting heaters, the semiconductor coatings that precipitate upon the exposed surface areas during preceding epitaxial production of grown layers upon flat or disc-shaped substrates. More specifically, the invention aims at avoiding the above-mentioned disadvantages, particularly by affording the removal of such heater coatings without disassembling the processing equipment and without the necessity of touching the heater structures with tools or other objects that may introduce contamination into the equipment.

To achieve these objects, and in accordance with a concept underlying my invention, I take advantage of the fact that by means of a suitable gaseous agent, particularly at high temperatures, the precipitated semiconductor material can be dissolved and thereby removed from the heater structure. This involves a chemical reaction of the precipitated semiconductor material with the gaseous agent, and the formation of a gaseous semiconductor compound.

However, it is essential to the invention that during performance of the epitaxial production proper, the supporting heater structure being employed consist, at least at its surface, of a material different from the semiconductor substance being precipitated. According to another, conjoint feature, such a heater structure, upon termination of the epitaxial processing stage proper, is subjected to an atmosphere that contains halogen atoms, namely a halogen or halogen compound, and is heated in this atmosphere to such a high temperature that the coating of precipitated semiconductor substance grown on the heater surface is eliminated under formation of a gaseous halogen compound of the semiconductor material.

The invention will be further described with reference to the drawing showing in vertical section an apparatus for epitaxial production of p-n junction devices and for also performing the method of the invention.

The reaction vessel of the apparatus comprises bell 21 of quartz and a bottom structure 27 of metal. A planar pane 31, likewise of quartz, partitions the vessel into two chambers. Mounted in the reaction chamber proper, above the pane 31, is a support 24 consisting of a bar-shaped electric heater, for example of silicon carbide or graphite coated with silicon carbide. A number of semiconductor discs 23, for example of hyperpure silicon, are placed on top of the heater 24. Only three such discs are shown, although it will be understood that it is preferable in practice to thus accommodate a larger number of discs. The reaction gas to be thermally decomposed passes into the reaction chamber through an inlet nipple 20. The residual gases leave the reaction chamber through an outlet nipple 22.

The heater 24 is attached between two electrodes 25 and 26. The electrode 26 is conductively connected with the bottom structure 27 of the apparatus and thus is kept on the same electric potential, namely ground potential. The second electrode 25 is connected to a conductor 28 which passes through the bottom structure 27 to the outside of the apparatus and is insulated from the bottom structure by means of a bushing 30. The conductor 28 is connected with one pole of a current-supply source 29 whose other pole is grounded.

During crystal-layer production, silicon is precipitated from the reaction gas onto the surfaces of the silicon discs 23, which are kept at a temperature of about 1000 to 1250° C. After the silicon discs have attained the required thickness, the bell 21 is opened and the silicon discs are removed. A new group of silicon discs can thereafter be processed in the same manner.

After a number of such production processes it becomes necessary to clean the heater from adhering silicon. For this purpose, the bell 21 is closed without placing new discs upon the heater, and the reaction chamber is then supplied with the gas or gas mixture required according to the invention for dissolving the precipitate from the heater surface, the heater being then heated at the necessary reaction temperature, as will be more fully described hereinafter with reference to specific examples.

Since the heater consists entirely, or in its surface region, of a material different from that of the precipitated semiconductor material, the chemical reaction that subsequently causes elimination of the semiconductor precipitate, continues only until the semiconductor coating grown during the preceding epitaxial production is fully removed.

The heater material of necessity must be refractory to the extent required to apply the necessary high reaction temperature, aside from being electrically conductive, at least in heated condition. Heater materials that are commercially available in high degrees of purity are preferable. It is particularly advantageous to employ as heater a semiconductor material different from that being precipitated. For example, in the epitaxial production of germanium semiconductors, the heater structure may consist entirely of silicon or it should at least have a coating of silicon. For silicon epitaxy a heater consisting of pure silicon carbide either entirely or at least at its surface is well suitable. Heaters of silicon carbide are also applicable for epitaxial production of germanium semiconductors. Heaters of silicon, silicon carbide, as well as heaters of germanium, can be employed for epitaxial precipitation of $A^{III}B^{V}$ compounds. Thus, the heater material may be chosen to suit the requirements of the particular semiconductor material being precipitated.

However, heaters of materials other than semiconductor substances are also applicable. For example, heating elements consisting of graphite or similar carbon material can be used. It is essential, in selecting the heater material, that it consists entirely or to a major proportion of the material which is not attacked chemically or thermally by the gas composition at the temperature required for eliminating the semiconductor material from the heater surface. Particularly, the melting point of the heater material should be higher than that of the semiconductor substance being processed.

Gases suitable for the elimination of the semiconductor coating are, for example halogen-hydrogen compounds, particularly hydrogen chloride. Pure halogens, particularly chlorine or iodine, also effect the desired elimination of the coating from the heater. Suitable also are halogen compounds or halogen-hydrogen compounds of the precipitated semiconductor substance, without the addition of hydrogen, but if desired in mixture with an inert or noble gas such as argon, the temperature of the heater being then made sufficiently high to dissociate this compound under formation of a corresponding halogen or halogen hydride. The evolving halogen or halogen hydride then effect the elimination of the semiconductor coating grown on the heater.

When using heaters of graphite, there occurs, in general, a contamination of the precipitated semiconductor coatings by impurity atoms evaporating out of the graphite body. This is the case particularly at the high temperatures required for epitaxial processing of silicon. In order to avoid such contamination, it is preferable to employ a heater of graphite coated with the semiconductor material to be precipitated. The heater then constitutes a core coated with a jacket of the precipitated semiconductor substance. When the semiconductor material precipitated upon the heater during the epitaxial process is subsequently eliminated in the manner described above, the original protective coating is also removed. However, it can readily be reestablished by introducing a corresponding gaseous compound of the semiconductor substance into the processing chamber after the elimination process is completed. In this case it is particularly advantageous to employ a halogen compound or halogen-hydrogen compound of the same semiconductor substance for the elimination process, because the elimination of material can then simply be converted into a precipitation process by reducing the heater temperature. In this case, too, it is not necessary to remove the heater from the epitaxial precipitation apparatus. The invention will be further elucidated by the following examples.

*Example 1*

Mounted in the precipitation vessel is a heater of graphite or silicon carbide in pure form upon which during preceding silicon epitaxy, described above with reference to the drawing, an undesired amount of silicon was precipitated. After removing the semiconductor discs previously provided with epitaxially grown layers, water-free hydrogen chloride, if desired diluted with inert gas or hydrogen, is supplied into the reaction vessel and the heater is heated up to 750° C. Now the silicon layer previously grown upon the heater is converted to gaseous silicochloroform according to the equation $$Si+3HCl \rightarrow SiHCl_3+H_2 \qquad (1)$$

The gaseous compound passes out of the reaction vessel. During this operation the gas is preferably kept in a continuous flow through the vessel and the operation is terminated when a complete or sufficient removal of the coating is observed.

*Example 2*

The method is performed in the same manner as described in Example 1 except that the heater is not heated in a hydrogen chloride atmosphere but in pure chlorine and is brought up to a temperature of at least 1000° C. According to the equation $$Si+4Cl \rightarrow SiCl_4 \qquad (2)$$

gaseous silicon tetrachloride is formed from the coating previously grown on the heater. The gaseous compound passes out of the reaction vessel.

*Example 3*

Pure silicon tetrachloride without addition of hydrogen is supplied into the reaction vessel and the heater is simultaneously heated to about 1300° C. At this temperature the gaseous silicon tetrachloride is dissociated into gaseous silicon subchloride ($SiCl_2$) and chlorine. By reaction of the chlorine with the silicon coating on the heater, the silicon is eliminated in accordance with Equation 2.

*Example 4*

Pure silicochloroform without addition of hydrogen is supplied into the reaction vessel, and the heater is heated to about 1300° C. Gaseous silicon subchloride and hydrogen chloride are formed. The hydrogen chloride reacts with the silicon coating on the heater and results in elimination of the silicon according to Equation 1.

The method according to the invention is analogously applicable for eliminating the undesired coating from the heaters employed in germanium epitaxy or for epitaxial precipitation of a $A^{III}B^{V}$ compounds.

I claim:

1. In the production process of growing monocrystalline semiconductor layers on substrates of semiconductor material by thermal dissocation of gaseous semiconductor compound and precipitation of the resulting semiconductor substance upon the substrates placed upon and heated by a supporting heater structure consisting at least at its surface of a refractory material different from the semiconductor substance being precipitated and more resistive to reactive agents at high temperatures than the substance being precipitated the method of removing from the heater structure while in situ the semiconductor coating grown upon it during the thermal production process, which comprises heating the structure, between successive runs of the semiconductor layer production and after removal of the substrate from the structure, to reaction temperature in a gas containing halogen atoms to form a gaseous compound of the semiconductor coating, whereby the coating is eliminated from the heater structure.

2. The method of removing the semiconductor coating grown upon a supporting heater structure in a reactor upon which semiconductor substrates are located during epitaxial semiconductor precipitation on said substrates, which comprises passing a gas selected from the group consisting of halogen and hydrogen halide into the reactor and heating the heater in situ, upon termination of the epitaxial precipitation and removal of the substrates from the reactor, to reaction temperature with the gas to form a gaseous compound of the semiconductor coating whereby the coating is eliminated from the heater.

3. The method of removing the semiconductor coating grown upon a supporting heater structure in a reactor upon which semiconductor substrates are located during epitaxial semiconductor precipitation on said substrates, which comprises passing a mixture of an inert gas and a gas selected from the group consisting of halogen and hydrogen halide into the reactor and heating the heater in situ, upon termination of the epitaxial precipitation and removal of the substrates from the reactor, to reaction temperature with the gas to form a gaseous compound of the semiconductor coating whereby the coating is eliminated from the heater.

4. In the process of epitaxially producing semi-conductor layers on substrates of semiconductor material by thermal dissociation of gaseous semiconductor compound and precipitation of the resulting semiconductor substance upon the substrates placed upon and heated by a supporting heater structure consisting at least at its surface of a refractory material different from the semiconductor substance being heated; the method of removing from the heater structure the semiconductor coating grown upon it during the epitaxial production process, which comprises, removing the substrates from the reactor upon termination of production of the semiconductor layer, passing HCl over the heater structure and heating the heater structure to a temperature to form a gaseous compound of the semiconductor coating whereby the HCl reacts with the semiconductor coating on the heater structure, thereby eliminating the coating from the heater structure.

5. In the process of epitaxialy producing semiconductor layers on substrates of semiconductor material by thermal dissociation of gaseous semiconductor compound and precipitation of the resulting semiconductor substance upon the substrates placed upon and heated by a supporting heater structure consisting at least at its surface of a refractory material different from the semiconductor substance being heated; the method of removing from the heater structure the semiconductor coating grown upon it during the epitaxial production process, which comprises, removing the substrates from the reactor upon termination of the semiconductor layer, passing $Cl_2$ over the heater structure and heating the heater structure to a temperature to form a gaseous compound of the semiconductor coating whereby the $Cl_2$ reacts with the semiconductor coating on the heater structure, thereby eliminating the coating from the heater structure.

6. In the process of epitaxially producing semiconductor layers on substrates of semiconductor material by thermal dissociation of gaseous semiconductor compound and precipitation of the resulting semiconductor substance upon the substrates placed upon and heated by a supporting heater structure consisting at least at its surface of a refractory material different from the semiconductor substance being heated; the method of removing from the heater structure the semiconductor coating grown upon it during the epitaxial production process, which comprises, removing the substrates from the reactor upon termination of the semiconductor layer, passing a halogen compound of the semiconductor material to be eliminated over the heater structure and heating the heater structure to a temperature to form a gaseous compound of the semiconductor coating whereby the halogen compound reacts with the semiconductor coating on the heater structure, thereby eliminating the coating from the heater structure.

7. In the process of epitaxially producing silicon layers on semiconductor substrates by thermal dissociation of gaseous semiconductor compound and precipitation of the resulting semiconductor substance upon the substrates placed upon and heated by a supporting heater structure consisting at least at its surface of a refractory material different from the heated substrate, the method of removing from the heater structure the semiconductor coating grown upon it during the epitaxial production process, which comprises, removing the substrates from the reactor upon termination of production of the semiconductor layer, passing HCl over the heater structure and heating the heater structure to a temperature of about 750° C. to react the HCl with the semiconductor coating on the heater structure to form a gaseous compound of the semiconductor coating, thereby eliminating the coating from the heater structure.

8. In the process of epitaxially producing silicon layers on substrates of semiconductor material by thermal dissociation of gaseous semiconductor compound and precipitation of the resulting semiconductor substance upon the substrates placed upon and heated by a supporting heater structure consisting at least at its surface of a refractory material different from the heated substrate, the method of removing from the heater structure the silicon coating grown upon it during the epitaxial production process, which comprises, removing the substrates from the reactor upon termination of the semiconductor layer production, passing $Cl_2$ over the heater structure and heating the heater structure to a temperature of about 1000° C. to react the $Cl_2$ with the silicon coating on the heater structure to form a gaseous compound of the semiconductor coating, thereby eliminating the silicon coating from the heater structure.

9. In the process of epitaxially producing silicon layers on semiconductor substrates by thermal dissociation of gaseous semiconductor compound and precipitation of the resulting semiconductor substance upon the substrates placed upon and heated by a supporting heater structure consisting at least at its surface of a refractory material different from the substrates being heated, the method of removing from the heater structure the semiconductor coating grown upon it during the epitaxial production process, which comprises, removing the substrates from the reactor upon termination of the semiconductor layer, passing $SiCl_4$ over the heater structure and heating the heater structure to about 1300° C., whereby the $SiCl_4$ reacts with the silicon coating on the heater structure to form a gaseous compound of the semiconductor coating and eliminate the coating from the heater structure.

10. In the process of epitaxially producing silicon layers on semiconductor substrates by thermal dissociation of gaseous semiconductor compound and precipitation of the resulting semiconductor substance upon the substrates placed upon and heated by a supporting heater structure consisting at least at its surface of a refractory material different from the substrates being heated, the method of removing from the heater structure the semiconductor coating grown upon it during the epitaxial production process, which comprises, removing the substrates from the reactor upon termination of the semiconductor layer, pasing $SiHCl_3$ over the heater structure and heating the heater structure to about 1300° C., whereby the $SiHCl_3$ reacts with the silicon coating on the heater structure to form a gaseous compound of the semiconductor coating and eliminate the coating from the heater structure.

References Cited by the Examiner

UNITED STATES PATENTS

| | | | |
|---|---|---|---|
| 2,199,418 | 5/1940 | Redmond, et al. | 134—3 |
| 2,430,994 | 11/1947 | Reynolds | 117—106 |
| 2,692,839 | 10/1954 | Christensen et al. | 148—175 |
| 2,744,000 | 5/1956 | Seiler | 156—17 |
| 2,802,759 | 8/1957 | Moles | 148—180 |
| 2,842,464 | 7/1958 | Dickinson et al. | 134—3 |
| 2,852,418 | 9/1958 | MacDonald | 134—2 |
| 2,992,127 | 7/1961 | Jones | 117—228 |
| 3,007,816 | 11/1961 | McNamara | 253—62.3 |
| 3,086,881 | 4/1963 | Jenkin | 117—160 |
| 3,131,098 | 4/1964 | Krsek et al. | 148—175 |
| 3,145,447 | 8/1964 | Rummel | 148—1.5 |
| 3,151,006 | 9/1964 | Grabmaier et al. | 148—174 |

FOREIGN PATENTS

| | | |
|---|---|---|
| 853,979 | 11/1960 | Great Britain. |
| 855,913 | 12/1960 | Great Britain. |

DAVID L. RECK, *Primary Examiner.*

N. F. MARKVA, *Assistant Examiner.*